April 8, 1969 — A. AUGUSTINE ET AL — 3,437,326

METAL MELTING AND REFINING FURNACE

Filed June 1, 1967 — Sheet 1 of 3

INVENTORS
ALFRED AUGUSTINE
JAMES M. GUTHRIE
BY Christy, Parmelee & Strickland
ATTORNEYS.

INVENTOR.
ALFRED AUGUSTINE.
JAMES M. GUTHRIE.

United States Patent Office 3,437,326
Patented Apr. 8, 1969

3,437,326
METAL MELTING AND REFINING FURNACE
Alfred Augustine, Pittsburgh, and James M. Guthrie, Crafton Borough, Pa., assignors to Loftus Engineering Corporation, Pittsburgh, Pa., a corporation of Maryland
Filed June 1, 1967, Ser. No. 642,764
Int. Cl. F27b 3/02, 3/16
U.S. Cl. 263—40                                        8 Claims

ABSTRACT OF THE DISCLOSURE

This disclosure relates to metal melting and refining furnaces whose walls extending upwardly from the furnace hearths are curved, as viewed in a horizontal plane of section. The furnace roofs are removable without vertical motion from closed positions on the bodies of the furnaces; the roof merely shifted in a substantially rectilinear horizontal direction. The curved walls of each furnace provide integrity of such wall during the rough serve to which they are subjected by impact of materials deposited in the furnace while charging it through open roof sections, and means are provided to cooperate with the peripherally extending top edge or rim of the furnace walls for gaseously sealing the so-called non-lift roof to the furnace body while the roof is in closed position.

---

The invention herein disclosed relates to improvements in the structure of metal melting and refining furnaces, furnaces particularly designed for the melting and/or refining of such non-ferrous metals as aluminum, and the invention consists in a novel combination of features of furnace construction.

The object of the invention is to provide a melting furnace with a removable roof which may, without first lifting the roof, be removed in whole or in part from the walls of the furnace body, to permit the furnace to be charged by means of charging buckets introduced to the furnace chamber through the opening created by the removal of the roof.

Another object of the invention is to provide a metallurgical furnace structure with curved refractory walls which are adapted to maintain their integrity during the opening and closing movements of a heavy non-lift roof.

Still another object is to provide in conjunction with the foregoing objects improved means for sealing removable furnace roofs to the peripheral top edges of the walls of the furnace bodies, whereby the hot flames and products of combustion developed during the firing of the furnaces may, as and when desired, be maintained under superatmospheric pressure, without an objectionable stingout between the roofs and the top rims of said furnace walls.

A furnace providing exemplary emobdiment of the invention is illustrated in the accompanying drawings, in which:

FIG. 6 is a diagrammatic view in plan and to smaller scale, showing two rectangular furnaces in outline from above and the arrangement of a pair of parallel tracks on which the non-lift roof parts of the furnaces may travel between open and closed position;

FIG. 7 is a similar view of two furnaces of circular form in plan, showing the tracks on which the non-lift roofs of such furnaces may move between open and closed positions.

Figure 1:
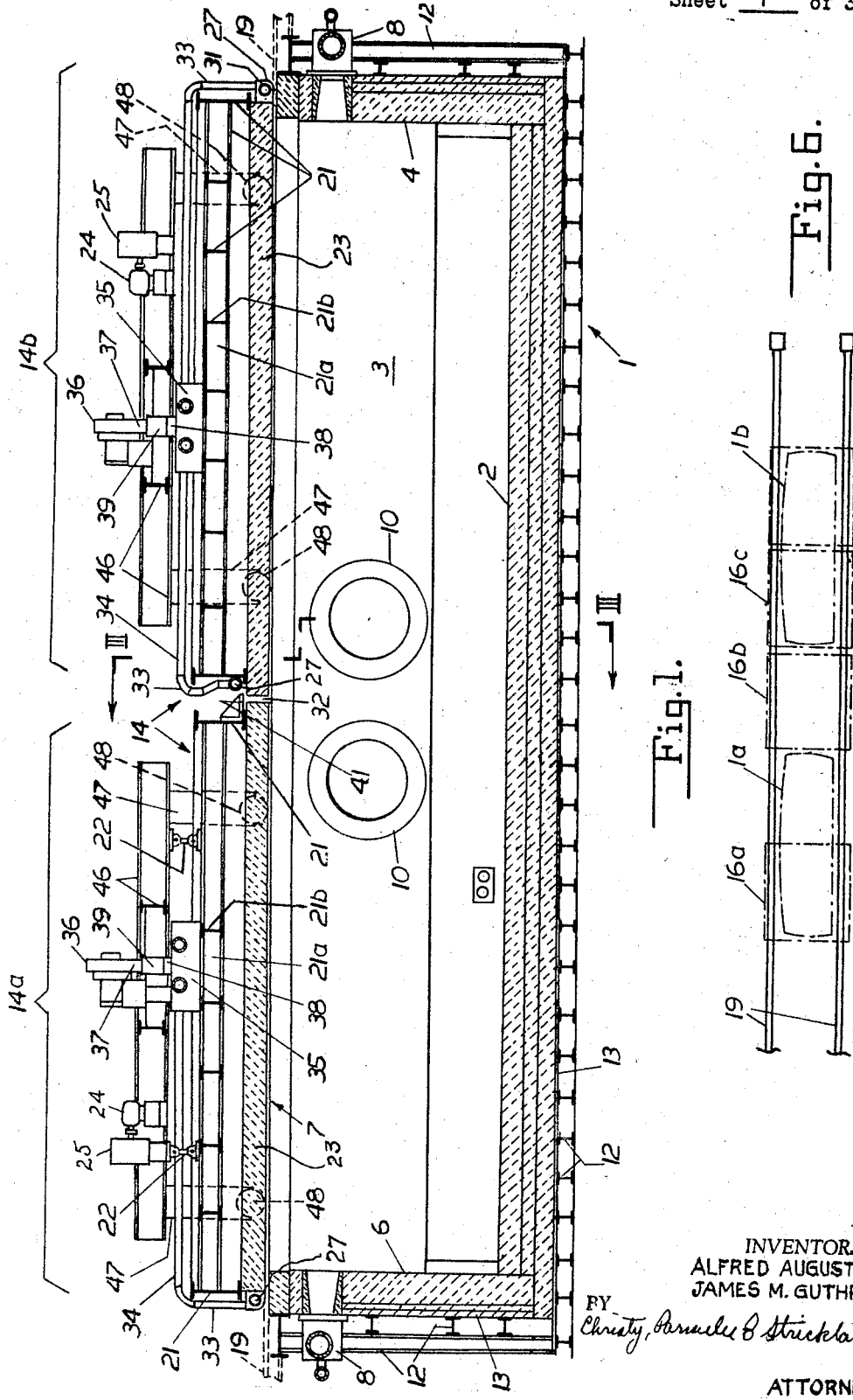
FIG. 1 is a view partly in elevation and partly in vertical section of the furnace, as seen on the "broken" plane I—I of FIG. 3.
Figure 2:
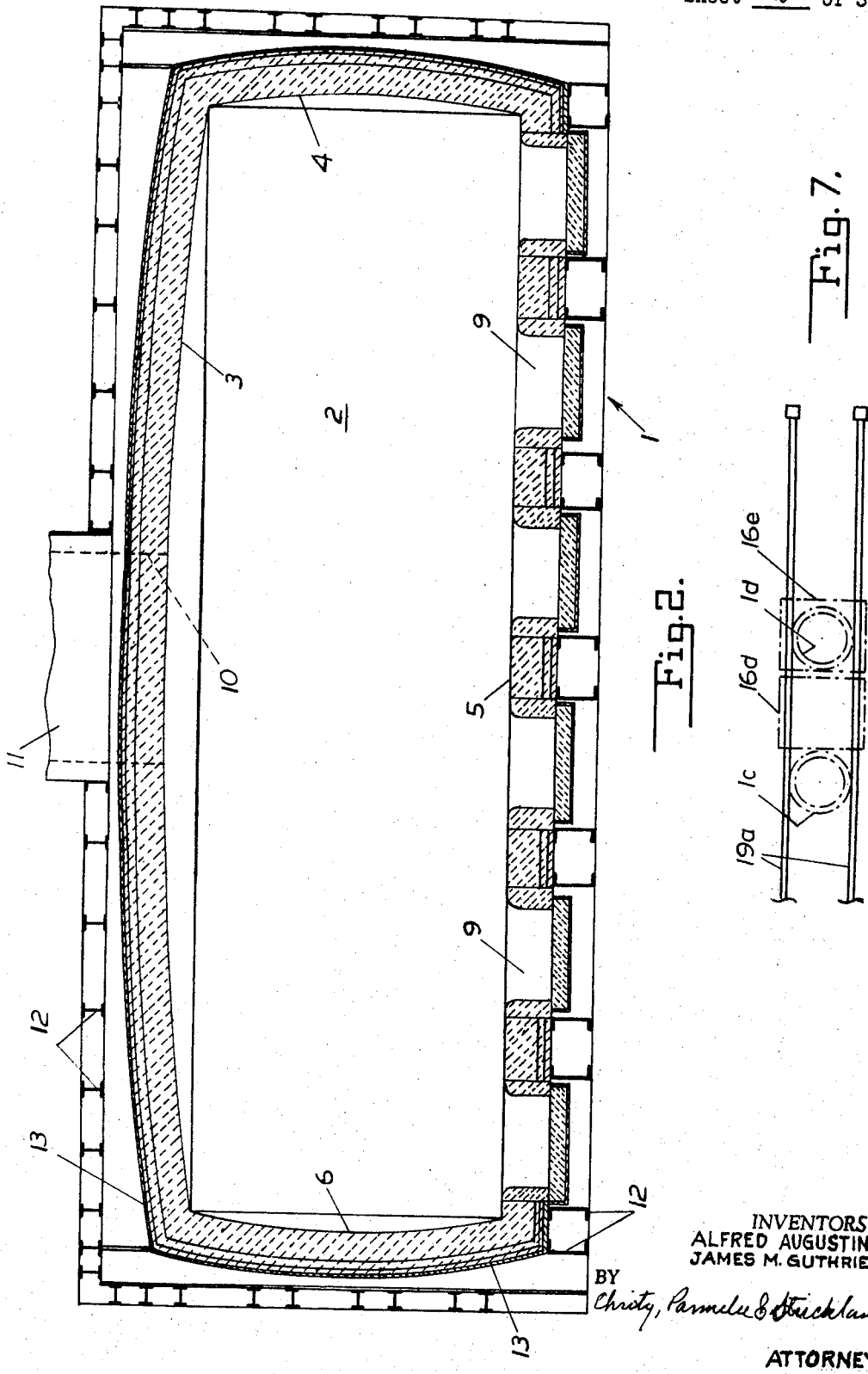
FIG. 2 is a view of the furnace in horizontal section, as seen on the "broken" plane II—II of FIG. 3.
Figure 3:
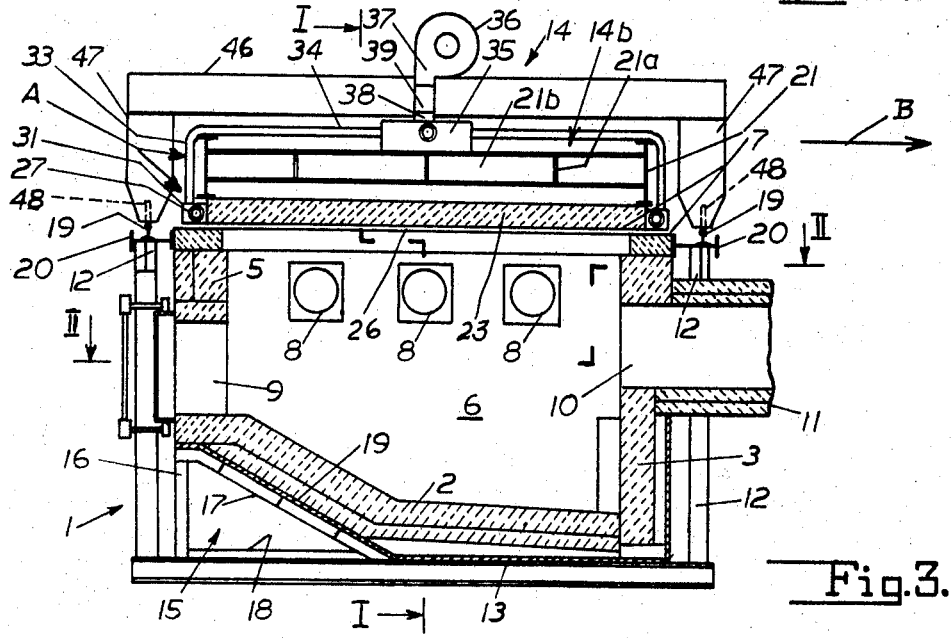
FIG. 3 is a view of the furnace partly in elevation and partly in vertical cross section, as seen on the "broken" plane III—III of FIG. 1.

Referring to FIGS. 1, 2 and 3 of the drawings, the furnace 1 comprises a refractory hearth 2 and refractory side wall portions 3, 4, 5 and 6 rising from the hearth to form a peripheral rim 7, the rim formed by said wall portions being peripherally continuous. While all of the wall portions may be internally curved as viewed in horizontal section, whereby the several furnace side walls portions, as seen in plan from about, may be of circular or elliptical form. In this case the furnace is advantageously of substantially rectangular form as shown in FIG. 2. The back wall portion 3 is of the curved form shown in FIG. 2, while the front wall portion 5 is preferably straight. The end wall portions 4 and 6 may be curved.

Burners 8 open through the end wall portions 4 and 6; doors 9 open through the front wall portion 5; and one or more ports 10 open through the back wall portion 3 itno flues 11 for the escape of the hot products of combustion developed by the burners 8. The flames and hot products of combustion developed in the furnace under superatmospheric pressure melt the metallurgical materials charged upon the hearth 2 of the furnace. The molten bath of metal is then held until ready for withdrawal or tapping.

The refractory hearth and wall of the furnace are encased, or tied and reinforced, by structural steel binding of buckstays 12 and plate 13 in accordance with usual practice, and this specification need not go into further detains on such matters as are well known in the art.

Advantageously, the hearth 2 is constructed in such way as to obtain substantially uniform thermal expansion and contraction thereof under the effects of variations in furnace temperature. This is achieved by forming the refractory body of the hearth of approximately the same thickness throughout its length and breadth. To this end a "chill" 15 is provided along the bottom of the front wall portion 5 of the furnace, the chill being an open-work frame of structural steel 16, 17 and 18 (FIG. 3) carry a steel plate 19 that inclines upwardly from the hearth plate 13, whereby the hearth's refractory body 2 may be of approximately uniform thickness and yet provide a durable container for the molten metal produced in the furnace. The features of this "chill" structure 15 will be fully appreciated upon reference to U.S. Patent No. 2,866,628, granted Dec. 30, 1958 to patentee Walter Suydam and assigned to the assignee hereof.

As indicated in FIG. 3, there are three high-velocity burners 8 in each end wall of the furnace, and these burners may all be operated in unison when greatest firing rate is desired; then for an intermediate rate of firing the two end burners of each row of the three burners may be operated; and finally when the lowest rate of firing for holding or thermal soaking is desired the central burners of each set of burners will be used. The general sequence of operating a high-velocity combustion system—a system in which the combustion air leaves the burners at a speed of from 200 to 500 feet per second—is covered in detail in U.S. Patent No. 3,198,855, granted Aug. 3, 1965, on the application of one Walter Suydam, and owned in common with the present application for patent.

The furnace roof 14 is designed to be removed from and returned to closed position over the side wall portions 3, 4, 5 and 6 in a rectilinear direction, preferably a horizontal direction, and a feature of importance is that the roof need not be lifted preparatory to such movement. In this case the roof is formed in two parts 14a and 14b. Each roof part comprises a carriage formed of a rectangular structural steel frame 46 with a vertical leg 47 adjacent to each corner and in the lower ends of each of the four legs 47 a traction wheel 48 is journaled. Such wheels, pair by pair, ride two parallel tracks 19 supported on horizontal steel beams 20 carried on the upper ends of the structural steel buckstays 12 that are spaced apart along the front and backwall portions 3 and 5 of the furnace. The tracks are located at about the level of the peripheral rim 7 of the furnace body. The tracks 19 extend to points spaced outwardly from the body of the furnace 1, and in this extension of the tracks beyond the furnace the beams 20 and their supporting buckstays 12, or their equivalent, are provided as need be.

Figure 5:
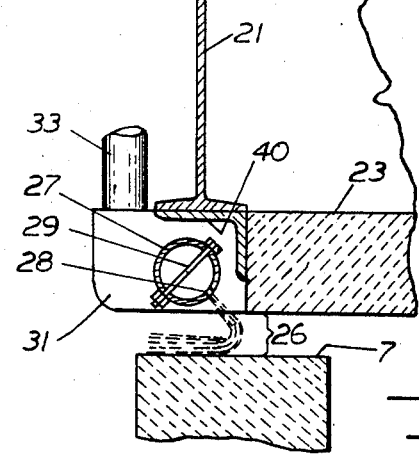
FIG. 5 is a fragmentary sectional view on larger scale of a detail of the furnace structure in the area indicated by the arrow A in FIG. 3.

Each roof part comprises a structural steel frame formed of outer I-beam components 21 and intersecting cross beams 21a and 21b. The I-beam components 21 in their longitudinal extent may be contoured to the curvature of the wall portions 3, 4, 5 and 6 over which the respective beam components are located when the roof is in closed position. Each steel frame is suspended by conventional means, such as pivoted links 22 (FIG. 1), from its carriage 46, and said frame supports an arch of refractory materials. The arch may be a conventional sprung arch built of refractory blocks or, as here shown, a flat arch 23 of refractory blocks or a cast slab of plastic refractory material suspended in known way from the members of frame 21. The periphery or edge of the refractory roof arch 23 conforms in outline to the rim 7 of the furnace wall portions 3, 4, 5 and 6, and when the roof parts are in closed position such periphery of the roof arch overhangs the rim 7, as indicated in FIGS. 3 and 5, with a peripherally extending clearance 26 between the roof arch and the rim 7. The height of this clearance averages about 1½ inches under ideal conditions.

Mounted on each carriage frame 46 is an electric motor 24 which, by means of a speed-reducing gear-box 25, is arranged to drive the two traction wheels 48 beneath it, through a roller-chain drive, or through a transmission gear train, not shown, but consisting of one of several mechanical designs well known to those skilled in the art. Thus, the cover parts may be independently moved from the closed positions in which they appear in FIG. 1 into open position removed from the above furnace. By providing for this maneuvering of the cover or cover parts the furnace may be entirely or partially uncovered for quickly introducing charge components to the furnace in large masses, as by means of large charging buckets and overhead cranes.

The power wiring and controls for the electric motors, and the instrumentation and combustion controls for the furnace are matters of normal engineering, wherefore it is needless to involve this specification with them.

In the schematic view of FIG. 6, it will be understood that a plurality of rectangular furnaces, indicated by "broken" lines 1a and 1b, may be arranged in longitudinal alignment in a melt shop, and that the paired tracks 19 may be extended between and beyond the furnaces of the row, whereby the reach of rails between the successive or adjacent furnaces 1a and 1b may support the roof carriage 16b of furnace 1a in open position and there hold it so long as required, while the roof carriage 16a of furnace 1a and the complementary roof carriage 16c of adjacent furnace 1b remain in closed position. Alternately, when the roof carriage 16b of furnace 1a is closed, the carriage 16c of furnace 1b may move its roof position into open position. This doubles service of the rails for two or more furnaces permits a plurality of furnaces to be more closely juxtapositioned than otherwise would be the case, all with a substantial savings in the floor area required in a given melt shop.

In some cases the floor area of a shop may permit the cover-supporting rails to be extended along the ends and rearwardly from the furnace body, in which event the furnace roof and its carriage may be formed as an unitary assembly removable from over the furnace (in the direction of the arrow B, FIG. 3) and there held during a charging operation.

FIG. 7 illustrates that a plurality of furnaces 1c and 1d of circular form, as viewed in plan, may be arranged in alignment, with tracks 19a adapted to carry the rectangular carriages 16d and 16e of the circular roofs of the respective furnaces. The space between the furnaces is such that the carriage-roof assembly of one furnace may be moved on the tracks 19a into the space between the furnaces, as the carriage-roof assembly 16d is shown in FIG. 7, to permit the top charging of the furnace 1c.

Figure 4:
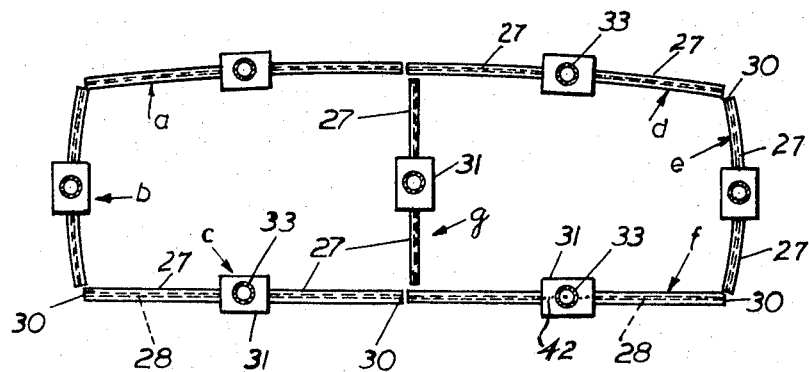
FIG. 4 is a diagrammatic plan view to smaller scale of a slotted pipe assembly included in the means for gaseously sealing the furnace roof to the furnace sidewalls.

As already mentioned the peripheral clearance 26 between the rim 7 and the overhanging edges of the roof arches 23 may average about 1½ inches. In combination with the rim of the curved wall portions 3, 4 and 6 and straight wall portion 5, means are provided for so far sealing such clearance 26 that the furnace may be operated with the average pressure of the hot combustion products in the furnace exceeding the pressure of the outside atmosphere. Said means comprise a duct or tube system shown in FIG. 4 comprised principally of tubes 27 each having a longitudinal slit 28 (FIG. 5) there-along. At intervals along the length of each tube 27 there are diametrically-extending bolts 29 with nuts at one end thereof. By tightening or loosening of these nuts, the width of the slit 28 may be varied. Wedges may be used in the slits 28 to gauge the degree of closing or opening. One end 30 (FIG. 4) of each slit tube is closed, while the other end is received and secured, but adapted for rotary tube adjustment, in a hollow-connector unit 31 which also constitutes a plenum chamber. In the particular arrangement shown in the drawings, there are two of these slit tubes 27 at the outer end of each of the two roof arches 23 and two slit tubes 27 at the inner ends of said two roof arches where the roof arches meet on a joint 32 (FIG. 1) when the two roof structures are in closed positions. At the front and the back of each roof arch 23 there are also two slit tubes 27. In the tube assembly shown in FIG. 4, the confronting closed ends 30 of the tubes are practically in end-to-end contact. Each of the hollow connector units 31 may have in its bottom a series of small holes 32 aligned with the slits 28 in the tubes connected thereby. For greater structural detail, reference is made to U.S. patent application Ser. No. 590,265, filed by one Alfred Augustine on Oct. 28, 1966, for improvements in "Soaking Pit and Method of Operating Same," and assigned in common with the present application for patent.

The three sets a, b and c (FIG. 4) of paired slit tubes 27 and their connector units 31 are respectively secured to angles 40 welded or otherwise secured to the lower edges of the back, outer end and front I-beam members 21 of the roof structure of the left-hand half of the furnace as seen in FIG. 1, while the four sets d, e and f of slit tubes and connector units are respectively secured in similar fashion to the back, outer end and front I-beam members 21 of the roof structure for the right-hand half of the furnace. The set g of slit tubes 27 and connector unit 31 is positioned above the lower edge or flange the inner end I-beam 21 of the right-hand roof half, whereby the curtain of air delivered by the latter slit tubes will play under a steel plate 41 above the joint 42 when the roof halves are in closed positions. The operation and effect of the specialized air curtains will be presently described in greater detail.

The connector units and the slit tubes may be attached to the I-beam 21 and angle 40 members by conventional metal clips and pipe hangers.

Each connector unit 31 has a down pipe 33 secured thereto, each down pipe forming the terminal portion of a feeder pipe 34 leading from a plenum chamber 35 that is positioned on the roof frame members 21a, 21b. Each feeder pipe 34, or each down pipe 33, may have a butterfly valve (not shown), or other suitable flow control valve.

It will be understood that each connector unit 31 supplies air to its two associate slit tubes 27 and there is a separate feeder pipe 34 leading from the plenum chamber 35 to each connector unit.

In the particular arrangement shown where each roof part is suspended from a carriage, air is supplied to the plenum 35 by means of a motor-driven blower 36 supported on the carriage with its outlet 37 connected at the inlet 38 of the plenum 35 through a flexible duct 39 of the bellows type. Under ideal conditions where the curb or rim 7 of the furnace wall portions is in good smooth condition, and where a substantially uniform clearance 26 is maintain between the roof arches and the rim 7, it is desirable that the tubes 27 be set in the approximate position shown in FIG. 5 where the discharge of air through the slot 28 and against the rim 7 is directed downwardly and inwardly to substantially bisect a vertical line drawn from the outer edge of the roof arch 23 to the rim 7. In the particular instance shown, this angle is approximately 30° off vertical so that the resulting curtain of air is not vertical, but projects inwardly under the roof. When the air encounters the rim 7, it would be expected that it would deflect upwardly and inwardly, but instead it curls under the air curtain and comes out generally parallel with the level of the top of rim 7. This is apparently due to the action of the high velocity air which converts much of its kinetic energy to pressure energy and to the interaction between this air and the hot gases in the furnace. At any rate there is no "sting out" of flame or hot gases where this condition prevails, and a piece of paper held in the stream of outflowing air at the edge of rim 7 is not charred by the air, although it may, after a period of several minutes, become charred primarily from the radiation of heat from the interior of the furnace. It may be noted that a person's hand may be brought close to this position without serious discomfort.

The tubes 27 constituting the system around the rim 7 of the furnace may be 3 inches in inside diameter, and the maximum opening of the slot or slit may ordinarily be ⅛ inch. The inside diameter of the feeder and down pipes may be 4 inches. The holes 42 in the connector units are about ⅛ inch spaced about one diameter apart. The tubes 27 at their confronting ends and corner ends practically abut so that there is no break in the air curtain.

The blower 36 may be driven by a 7½ horsepower motor operating at a speed of 3,600 r.p.m. and is rated to produce 4,300 c.f.m. at 10 ounces pressure in the plenum chamber 35 and the pressure in the feeder pipes is adjusted to 3½ ounces, to provide an internal static pressure of 2⅓ ounces in the slit tubes 27.

While it is known that so-called air curtains have been used in various environments such as doorways through which persons or articles pass with considerable frequency, such installations commonly operate in the plane of the opening and are not angled inwardly as here, and are not concerned with the maintenance of the refractory walls of furnaces operating at high temperature and above which the heavy furnace roof arches are moved between open and closed positions. The air curtains have a cooling effect upon the rim 7 of wall portions 3, 4, 5 and 6, and this in conjunction with the curved form of the inner faces of refractory wall portion 3, 4 and 6 provides durability of furnace construction.

It will be seen that with this invention the kinetic energy of the air is utilized to oppose the escape of gases from the interior of the furnace, and the nice balance of pressures that would be required with a static air seal is not necessary. The cost of continuously operating the blower is less than the cost of maintaining the seal plates and sand seal of a conventional cover in operating condition, and is much more successful in eliminating sting-outs.

Also, it will be understood that the described bipartite or multiple-part roof with a gas-sealed joint between the parts may be used on soaking pits and other furnaces having removable roofs.

While there is shown and described a preferred embodiment of the invention, it will be understood that various changes and modifications may be made. In some cases it may even be desirable to project the air stream or curtain from the slitted tubes and connector units upwardly from ducts located in the top rim of the furnace wall portions with air impinging against the cover.

These and other changes and modifications may be made within the contemplation of the invention.

We claim:

1. A fuel-fired metal melting furnace having a body that includes a refractory hearth, said body comprising internally curved refractory wall portions rising from the hearth to form a peripherally continuous rim, a pair of substantially rectilinear tracks supported one at each of opposite sides of the furnace body and extending in parallelism to points spaced outwardly from such body, a substantially horizontal non-lift roof comprising a refractory arch carried by a metal frame having wheels upon which the roof may move on said tracks solely in a rectilinear course between an open position in which the roof is removed from above the furnace body and a closed position in which the roof covers the furnace body, with a clearance between the rim of said furnace body and the peripheral portion of the roof, and means for projecting a curtain of air into said clearance during the operation of the furnace to seal the clearance against the escape of the hot products of combustion existing in the furnace under superatmospheric pressure, said air-projecting means including slotted tubes assembled end to end along the peripheral extent of the clearance between the roof and the rim of the furnace body, with the slots in the tubes directed toward said clearance, together with a motor-driven air blower, and ducts for conducting the air delivered by the blower to said slotted tubes.

2. The structure of claim 1, in which the furnace body is of substantially rectangular form as viewed in plan, the internally curved refractory wall portions rising from said hearth including a straight front wall portion having doors opening therethrough to give access to said hearth.

3. The structure of claim 1, in which the furnace body is of substantially rectangular form as viewed in plan, the said internally curved wall portions including a back wall portion, two opposite end wall portions, together with a straight front portion extending between the end wall portions, the top edges of all said wall portions providing said peripherally continuously continuous rim.

4. Two aligned furnaces each of the structure defined in claim 1, said furnaces being spaced apart by a distance substantially equal to the length of the non-lift roof and its wheel-borne carrying frame of either furnace, said pair of tracks extending in continuity between the furnaces, whereby the roof with its wheel-borne carrying frame of either furnace may selectively travel on said tracks into position between the furnaces, as viewed in plan.

5. A fuel-fired metal furnace having a body that includes a refractory hearth, said body comprising internally curved refractory walls rising from the hearth to form a peripheral rim, a pair of substantially rectilinear tracks supported one on each of opposite sides of the furnace body and extending in parallelism in opposite directions from the furnace body to points spaced outwardly from such body, a substantially horizontal non-lift roof of bipartite construction, each part of the roof comprising a refractory arch carried by a metal frame having wheels upon which the roof part may move solely in a substantially rectilinear course on said tracks, said two roof parts being independently movable on the tracks between an open position to uncover at least a part of the furnace body and a closed position in which the two roof parts meet in a separable joint to cover the furnace body, with a clearance between rim of said furnace body and peripheral portions of the roof parts, and means for projecting a curtain of air into said clearance during the operation of the furnace to seal the clearance against the escape of the hot combustion products existing in the furnace under superatmospheric pressure.

6. The structure of claim 5, wherein the last mentioned means comprise a plurality of slotted tubes assembled end to end along the peripheral portion of each roof part with the slots of the tubes directed toward said clearance, a motor-driven air blower mounted on the frame of each roof part, and ducts for delivering air discharged by each blower to the slotted tubes of the associated roof part, the slotted tubes of the two roof parts, when said roof parts are in closed position on the furnace body, providing in effect along the entire periphery of the rim of the furnace body a continuous curtain of air directed into said clearance.

7. The structure of claim 5, wherein the last mentioned means comprise a plurality of slotted tubes assembled end to end along the peripheral portion of each roof part with the slots of the tubes directed toward said clearance, a motor-driven air blower mounted on the frame of each roof part, and ducts for delivering air discharged by each blower to the slotted tubes of the associated roof part, the slotted tubes of the two roof parts, when said roof parts are in closed position on the furnace body, providing in effect along the entire periphery of the rim of the furnace body a continuous curtain of air directed into said clearance, said means having a slotted tube assembly for directing a sealing curtain of air along the joint of the roof parts when in closed position.

8. An industrial furnace having a body including refractory side walls with top edges arranged to form a peripheral rim, a pair of substantially rectilinear tracks supported one on each of the opposite sides of the furnace body, a substantially horizontal non-lift roof formed of a plurality of roof sections, each part of the roof comprising a refractory arch carried by a metal frame having wheels upon which the roof part may move in a substantially rectilinear course on said tracks, said roof parts being movable on the tracks between an open position to uncover at least a part of the furnace body and a closed position in which the several roof parts meet respectively in separable joints to cover the furnace body, and means for severally projecting curtains of non-combustible gas at said joints substantially to seal the joints against the escape of hot furnace gases through the joints.

References Cited

UNITED STATES PATENTS

| | | | |
|---|---|---|---|
| 1,725,059 | 8/1929 | Colby | 263—50 |
| 2,407,047 | 9/1946 | West. | |
| 2,474,504 | 6/1949 | West | 263—43 |
| 2,514,860 | 7/1950 | Guthrie | 263—40 |

JOHN J. CAMBY, *Primary Examiner.*